(12) United States Patent
Wakchaure

(10) Patent No.: US 7,642,455 B2
(45) Date of Patent: Jan. 5, 2010

(54) TRANSFORMER CONSERVATOR ISOLATION VALVE (TCIV)

(76) Inventor: V. K. Wakchaure, c/o. CTR Manufacturing Industries Limited, Fire System Division, Nagar Road, Pune, Maharashtra (IN) 411 014

( * ) Notice: Subject to any disclaimer, the term of this patent is extended or adjusted under 35 U.S.C. 154(b) by 0 days.

(21) Appl. No.: 11/913,925

(22) PCT Filed: Apr. 13, 2006

(86) PCT No.: PCT/IN2006/000129

§ 371 (c)(1),
(2), (4) Date: Nov. 8, 2007

(87) PCT Pub. No.: WO2007/057917

PCT Pub. Date: May 24, 2007

(65) Prior Publication Data

US 2008/0190644 A1 Aug. 14, 2008

(30) Foreign Application Priority Data

Nov. 16, 2005 (IN) .................. 1426/MUM2005

(51) Int. Cl.
*H05K 5/00* (2006.01)
(52) U.S. Cl. .............. 174/50; 174/17 LF; 174/11 R; 174/17 VA; 174/17 CT; 137/398; 402/26; 361/268

(58) Field of Classification Search ............ 174/50, 174/481, 11 R, 17 LF, 17 VA, 17 CT, 58; 137/398, 414, 554, 587; 402/26; 361/268; 73/49.2, 40; 95/10
See application file for complete search history.

(56) References Cited

U.S. PATENT DOCUMENTS

| | | | | |
|---|---|---|---|---|
| 3,096,390 A | * | 7/1963 | Deniau | 174/11 R |
| 6,184,459 B1 | * | 2/2001 | McShane et al. | 174/17 LF |
| 6,667,438 B2 | * | 12/2003 | Schneider et al. | 174/50 |

* cited by examiner

*Primary Examiner*—Dhiru R Patel
(74) *Attorney, Agent, or Firm*—Howrey LLP

(57) ABSTRACT

A Transformer Conservator Isolation Valve (TCIV) comprising an inlet conduit or pipe (2), an outlet conduit or pipe (5) connected to a rectangular housing (7) with an operating device (10) fixed on a shaft (19) placed inside the rectangular housing (7) and lever (9) for locking of the operating device (10); the said operating device (10) is provided with a sealing gasket (20) fitted such that during flow of oil due to rupture of electrical transformer tank or bursting of electrical transformer bushing or draining of oil swings towards the outlet conduit or pipe (5) so as to restrict flow of oil from the electrical transformer conservator (1) to the electrical transformer tank (4). A handle (8) is provided with the operating device (10) outside the rectangular housing (7) which when truned anti-clockwise during operation, causes the operating device (10) to swing toward the inlet conduit or pipe (2) so as not to restrict flow of oil from the electrical transformer Conservator (1) during filtration or filling or refilling. Two locking plates (13 and 14) are provided outside the rectangular housing.

5 Claims, 2 Drawing Sheets

A.

B.

TRANSFORMER CONSERVATOR ISOLATION VALVE (TCIV)

FIELD OF INVENTION

The present invention relates to the field of an isolation valve, more particularly to electrical transformer Conservator Isolation Valve (TCIV) which is used between the conservator and buchholz relay in an electrical transformer for the purpose of isolating oil in the electrical transformer conservator mounted on top of the electrical transformer tank, in case of rupture of the electrical transformer tank or bursting of electrical transformer bushing.

BACKGROUND/PRIOR ART

When the oil of an electrical transformer becomes contaminated or properties of the oil deteriorate, there is a need to filter the oil. Since the oil is always filtered from the bottom of the electrical transformer and fed again into to the conservator or top filter valve of the electrical transformer tank, oil circulation is blocked whenever filtered oil is fed into the conservator, whose outlet conduit or pipe is fitted with a conventional design preset non return valve. Therefore filtration of oil cannot be done. In the existing or conventional design of preset non return valve (PNRV), isolation of the electrical transformer conservator occurs in case of bursting of electrical transformer tank or rupture of electrical transformer bushing mounted on the electrical transformer tank. However, during filtration or filling or refilling of electrical transformer oil, the PNRV by virtue of its inherent construction remains closed and prevents flow of oil. It is therefore necessary to obviate the above drawback of the prior art system by another device.

OBJECT OF INVENTION

The objective of the present invention is to eliminate the above-said drawbacks associated with prior valves.

The main objective of this invention is to provide a TCIV to be operated in dual mode for isolating the electrical transformer conservator during abnormal flow of oil due to rupture of electrical transformer tank or bursting of electrical transformer bushing or while draining oil from the electrical transformer tank and also not to isolate the electrical transformer conservator during normal flow of oil during filtration or filling or refilling.

SUMMARY OF INVENTION

The disadvantages associated with the prior art are overcome by designing the Transformer Conservator Isolation Valve (TCIV) which is operated in dual mode for isolating the electrical transformer conservator during abnormal flow of oil due to rupture of electrical transformer tank or bursting of electrical transformer bushing or while draining oil from the electrical transformer tank and also not to isolate the electrical transformer conservator during normal flow of oil during filtration or filling or refilling.

STATEMENT OF INVENTION

Accordingly the present invention relates to a Transformer Conservator Isolation Valve (TCIV) comprising an inlet conduit or pipe (2), an outlet conduit or pipe (5) connected to a rectangular housing (7) with an operating device (10) fixed on a shaft (19) placed inside the rectangular housing (7) and lever (9) for locking of the operating device (10); the said operating device (10) is provided with a sealing gasket (20) fitted such that during flow of oil due to rupture of electrical transformer tank or bursting of electrical transformer bushing or draining of oil swings towards the outlet conduit or pipe (5) so as to restrict flow of oil from the electrical transformer conservator (1) to the electrical transformer tank (4). A handle (8) is provided with the operating device (10) outside the rectangular housing (7) which when turned anti-clockwise during operation, causes the operating device (10) to swing toward the inlet conduit or pipe (2) so as not to restrict flow of oil from the electrical transformer conservator (1) during filtration or filling or refilling. Two locking plates (13 and 14) are provided outside the rectangular housing.

REFERENCE NUMERALS USED IN FIGURE ARE AS FOLLOW

Figure 1:
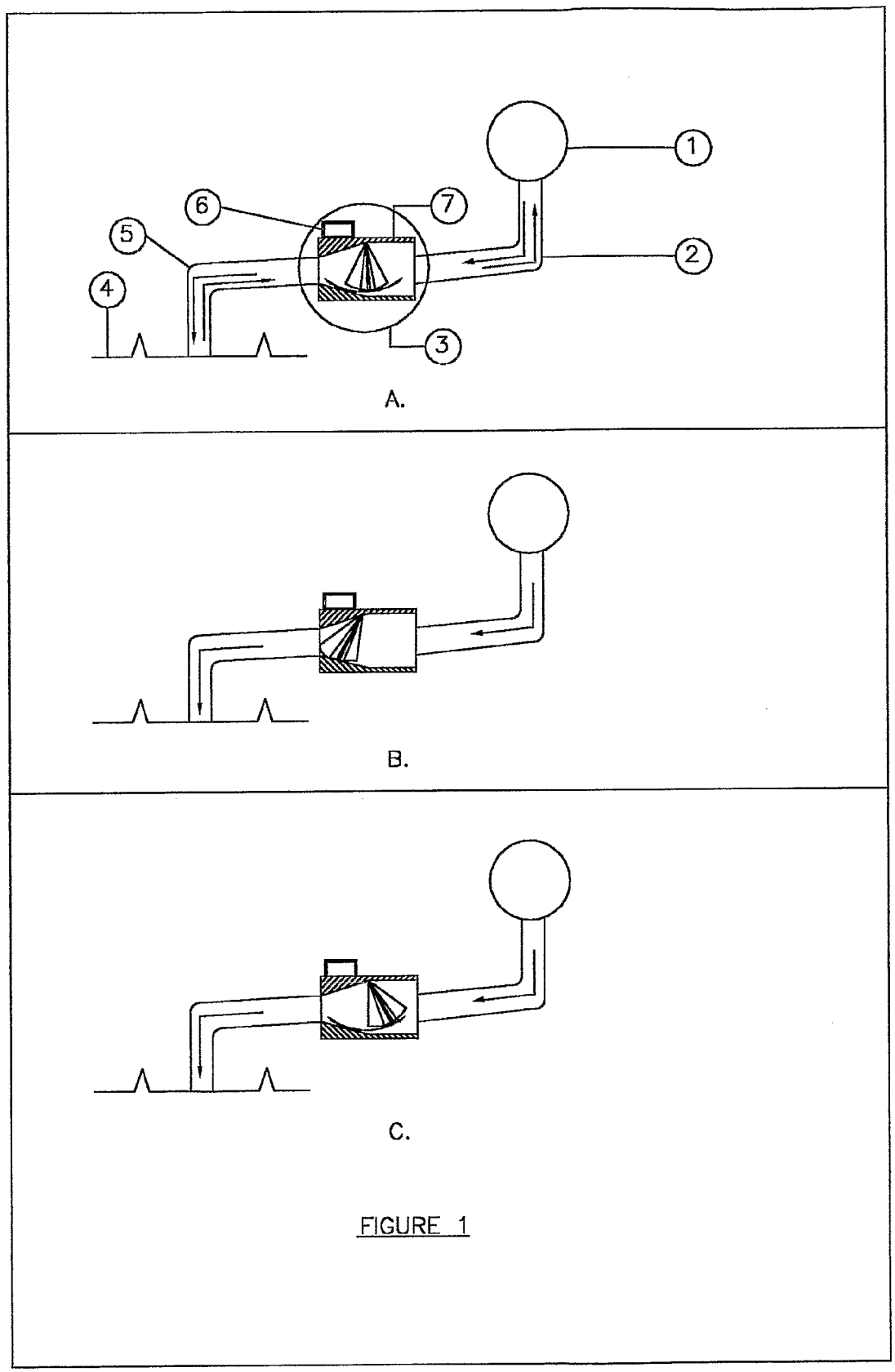
FIG. 1A shows the position of operating device during normal oil flow.
FIG. 1B shows the position of operating device during abnormal oil flow.
FIG. 1C shows the position of operating device during filtration or filling or refilling

1. Electrical Transformer conservator
2. Inlet conduit or pipe
3. Transformer Conservator Isolation Valve (TCIV)
4. Electrical transformer tank
5. Outlet conduit or pipe
6. Terminal box
7. Rectangular housing
8. Handle
9. Lever
10. Operating device
11. Glass window
12. Position of locking plate of operating device during normal oil flow.
13. Locking plate on handle (8) for padlocking during filtration or filling or refilling
14. Locking plate on handle (8) for padlocking during normal oil flow
15. Air release screw
16. Position of locking plate of operating device during filtration or filling or refilling
17. Switching device
18. Drain plug
19. Shaft
20. Gasket
21. One plate

DETAILED DESCRIPTION OF THE INVENTION

Accordingly, the present invention relates to a Transformer Conservator Isolation Valve (TCIV) comprising an inlet conduit or pipe (2), an outlet conduit or pipe (5) connected to a rectangular housing (7) with an operating device (10) fixed on a shaft (19) placed inside the rectangular housing (7) and lever (9) for locking of the operating device (10); the said operating device (10) is provided with a sealing gasket (20) fitted such that during flow of oil due to rupture of electrical transformer tank or bursting of electrical transformer bushing or draining of oil swings towards the outlet conduit or pipe (5) so as to restrict flow of oil from the electrical transformer conservator (1) to the electrical transformer tank (4). A handle (8) is provided with the operating device (10) outside the rectangular housing (7) which when turned anti-clockwise during operation, causes the operating device (10) to swing toward the inlet conduit or pipe (2) so as not to restrict flow of oil from the electrical transformer conservator (1) during filtration or filling or refilling. Two locking plates (13 and 14) are provided outside the rectangular housing.

In one embodiment of the present invention the said operating device is monitored by switching device (17) connected to terminal box (6).

In yet another embodiment of the present invention the rectangular housing comprises an air release screw (15) for releasing the trapped air inside the TCIV (3).

In still another embodiment of the present invention the locking plates (13 and 14) are provided with a handle (8) used for padlocking during normal oil flow and during filtration or filling or refilling.

In another embodiment of the present invention the said electrical transformer incorporates the said conservator isolation valve.

The TCIV comprises a rectangular housing with an inlet or outlet air release screw and drain plug, an operating device placed inside the housing and locking plates fitted with a handle, for locking the operating device. One shaft is provided in the middle of the housing fitted with one plate. When the lever is manually turned clockwise and set, the operating device inside the housing swings towards the outlet so as to restrict the flow of oil from the electrical transformer conservator in the direction of the electrical transformer tank as required in an abnormal situation due to rupture of the electrical transformer tank or bursting of electrical transformer bushing or while draining oil from the electrical transformer tank. When the lever is manually turned anti-clockwise and set, the operating device inside swings towards the inlet so as to allow free flow of oil from the transformer conservator in the direction of the transformer tank as required during filtration or filling or refilling. The TCIV operates as a non return valve so long as there is abnormal flow of oil, and operates as a conduit or pipe during normal flow of oil. In case of a sudden flow of oil considered as an abnormal flow, the valve mechanism inside moves clockwise and shuts off any passage of oil through the valve. By a novel invention of TCIV now invented, it can operate in a dual position by means of a lever, either to remain open or not to remain open, thereby allowing oil in the electrical transformer conservator to flow through the TCIV to the outlet conduit or pipe connected to the transformer tank, so that oil filtration or filling is possible. When the lever of the TCIV is turned anticlockwise to the filtering position, an operating device provided inside the TCIV gets engaged so that further movement of the TCIV is restricted and therefore oil can flow easily during filtration or filling or refilling. Therefore, the TCIV is working in a dual mode i.e. in one case for isolating the electrical transformer conservator in case of abnormal flow of oil from the electrical transformer conservator to electrical transformer tank and in the second case during filtration or filling or refilling where it allows free flow of oil.

Figure 2:
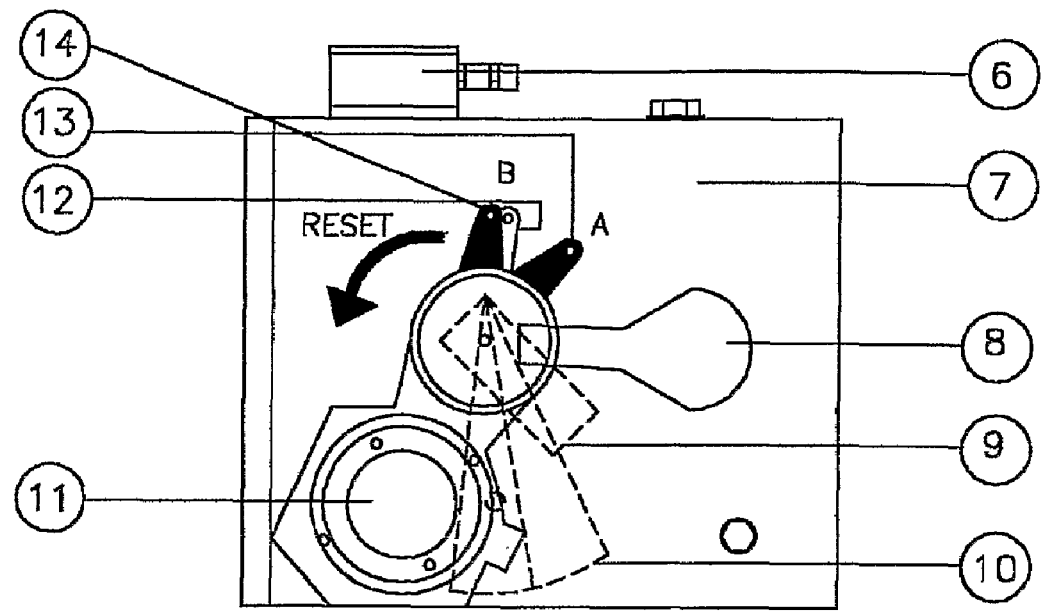
FIG. 2A shows the device position in the normal oil flow situation
FIG. 2B shows the device position in the filtration/filling situation
Figure 2:
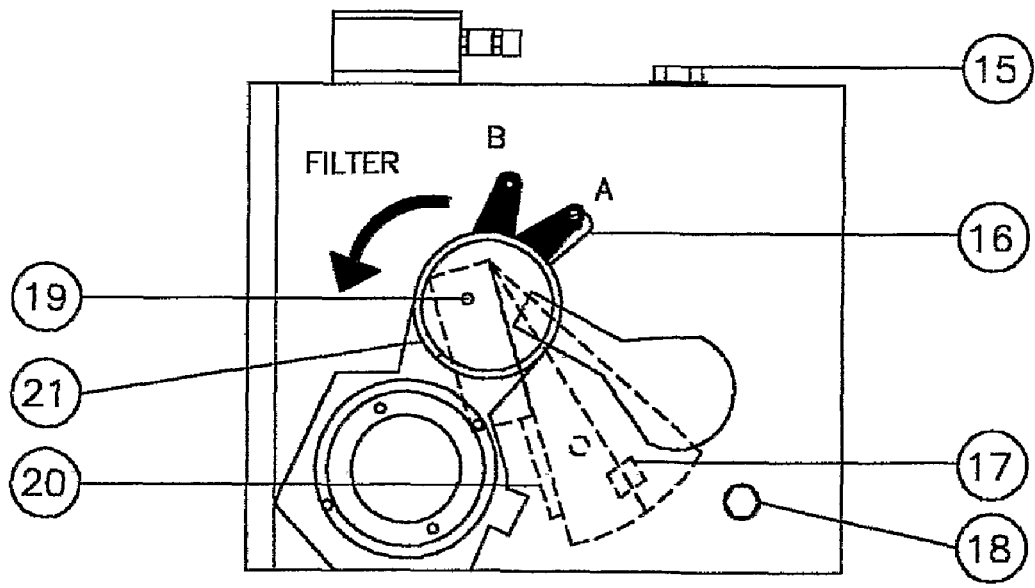

Referring to FIGS. 1 and 2, the rectangular housing (7) with terminal box (6) and air release screw (15) are mounted on the top with drain plug (18) at the bottom. One shaft (19) is provided in the middle of the housing (7) fitted with one plate (21) and two locking plates (13 and 14), are provided with a handle (8). The handle is used to take the locking plates to correct position for padlocking. The operating device externally houses the switching device (17) connected to terminal box (6) and inlet conduit or pipe (2) and outlet conduit or pipe (5) are connected to rectangular housing (7). The TCIV operates in a dual mode, which is selected by handle of operating device (8) provided outside the rectangular housing (7). An operating device (10) is provided inside the rectangular housing (7). During movement of the operating device under the abnormal conditions of filling, refilling/filtration, the operating device (10) has a sealing gasket (20) which under abnormal conditions isolates the flow of oil. It works like a pendulum to block the passage of inlet conduit or pipe (2) during filtration or refilling, abnormal flow of oil and allows normal flow of oil from transformer conservator (1) in the direction of the electrical transformer tank (4) and during filtration or filling or refilling, the handle (8) of operating device (10) is turned in anticlockwise direction. The movement of the operating device (10) fitted inside the rectangular housing (7) is restricted by a lever (9) in a fixed position thereby allowing free flow of electrical transformer oil through the outlet conduit or pipe (5) during filtration or filing or refilling. The position of the operating device (10) can be inspected through a glass window (11) provided in the rectangular housing (7).

ADVANTAGES OF THE INVENTION

The main advantage of the present invention is to provide a TCIV to be operated in dual mode for isolating the electrical transformer conservator during abnormal flow of oil due to rupture of electrical transformer tank or bursting of electrical transformer bushing or while draining oil from the electrical transformer tank and also not to isolate the electrical transformer conservator during normal flow of oil during filtration or filling or refilling.

I claim:

1. A Transformer Conservator Isolation Valve (TCIV) comprising: an inlet conduit or pipe (2), and outlet conduit or pipe (5) connected to a rectangular housing (7) with an operating device (10) fixed on a shaft (19) placed inside the rectangular housing (7) and lever (9) for locking of the operating device (10); said operating device (10) provided with a sealing gasket (20) fitted such that in response to abnormal flow of oil due to rupture of electrical transformer tank or bursting of electrical transformer bushing or draining of oil from the electrical transformer tank, said operating device swings clockwise towards the outlet conduit or pipe (5) so as to restrict flow of oil from an electrical transformer conservator (1) to the electrical transformer tank (4); a handle (8) provided with the operating device (10) outside the rectangular housing (7) which turns in anti-clockwise direction during filtration or filling of oil so that operating device (10) does not restrict flow of oil from the electrical transformer conservator (1) during filtration or filling of oil; and two locking plates (13 and 14) provided outside the rectangular housing for padlocking during normal oil flow and during filtration or filling of oil.

2. The transformer conservator isolation valve (TCIV) as claimed in claim 1, wherein said operating device (10) is monitored by a switching device (17) connected to terminal box (6).

3. The transformer conservator isolation valve (TCIV) as claimed in claim 1, wherein the rectangular housing (7) comprising air release screw (15) for releasing the trapped air inside the TCIV (3).

4. The transformer conservator isolation valve (TCIV) as claimed in claim 1, wherein the locking plates (13 and 14) are provided with the handle (8) used for padlocking during normal oil flow and during filtration or filling of oil.

5. The transformer conservator isolation valve, as claimed in claim 1 in combination with an electrical transformer.

* * * * *